UNITED STATES PATENT OFFICE.

HAROLD HIBBERT, OF PITTSBURGH, PENNSYLVANIA.

MANUFACTURE OF GLYCOLS.

No Drawing. Original application filed February 23, 1915, Serial No. 9,774. Divided and this application filed October 15, 1915. Serial No. 55,934.

1,270,759.          Specification of Letters Patent.     Patented June 25, 1918.

*To all whom it may concern:*

Be it known that I, HAROLD HIBBERT, a subject of Great Britain, residing in Pittsburgh, Allegheny county, State of Pennsylvania, have invented certain new and useful Improvements in the Manufacture of Glycols; and I do hereby declare the following to be a full, clear, and exact description of the invention, such as will enable others skilled in the art to which it appertains to make and use the same.

The present invention relates to glycol mixtures, and to the production of such mixtures from oil gas.

In the practice of the invention, the primary raw material employed is oil gas, that is to say, gas obtained from the vaporization and gasification of hydro-carbon oil, such as naphtha, solar oil, or the like. This oil gas is subjected to a temperature within the range of 600° C. to 900° C. in any suitable apparatus and is thereby cracked up into a mixture consisting essentially of about 40% to 60% of unsaturated ethylene derivatives, the remainder consisting principally of hydrogen, methane and ethane. The unsaturated derivatives referred to consist essentially of a mixture of ethylene, propylene and butylene, the proportions of these several constituents varying to some extent, according to the apparatus employed, the temperature within the range stated, and the mode of heating. The yield of the unsaturated derivatives can also be increased by operating under a materially reduced pressure, as compared with the yields obtainable when operating at the usual atmospheric pressure.

The mixture of unsaturated derivatives is then brought into contact with chlorin gas, thereby forming the corresponding dichlor derivatives. These chlorin compounds are then saponified by heating in the presence of an aqueous alkali carbonate solution at a temperature between 150° C. and 200° C. in an apparatus capable of withstanding a considerable pressure. The alkali carbonate solution that I have found particularly suitable for the purpose is an aqueous solution of sodium carbonate, and I find that under the conditions specified an excellent yield of the corresponding glycols may be readily obtained by its use.

The mixed glycol product thus obtained consists essentially of a mixture of ethylene, propylene and butylene glycols; which is a particularly valuable mixture because of the properties which distinguish it from the individual glycols.

What I claim is:

1. The process of producing a glycol mixture, which comprises subjecting oil gas to a temperature within the range of about 600° to 900° C., treating the resulting gaseous mixture with chlorin to convert the unsaturated derivatives into the corresponding chlorin compounds, and saponifying said chlorin compounds by heating the mixture in the presence of aqueous carbonate solution, under pressure, and thereby producing a mixture consisting essentially of ethylene, propylene and butylene glycols.

2. The process of producing a glycol mixture, which comprises chlorinating a mixture of unsaturated hydro-carbons of the ethylene series consisting essentially of ethylene, propylene and butylene, and saponifying the chlorin compounds thus obtained by treatment with an aqueous alkali metal carbonate solution as saponifying agent, thereby producing a mixture consisting essentially of ethylene, propylene and butylene glycols.

3. The method of producing a glycol mixture, which comprises cracking oil gas and thereby producing a mixture of unsaturated ethylene derivatives and of saturated hydro-carbons, chlorinating the unsaturated hydro-carbons of the ethylene series and thereby producing mixtures of the corresponding dichlorids, and saponifying the dichlorids with a solution of an alkaline carbonate, under pressure, and thereby producing a mixture of glycols.

4. The method of producing a glycol mixture, which comprises chlorinating a mixture of oil gas hydrocarbons of the ethylene series, and saponifying the chlorin compounds thus obtained by treatment with a solution of sodium carbonate, under pressure, and thereby producing a mixture of glycols of the ethylene series.

5. The method of producing glycols which comprises chlorinating hydrocarbons of the ethylene series to form dichlorids and saponifying the dichlorids by treatment with an aqueous solution of a water-soluble carbonate, under pressure, and thereby producing the glycols.

6. The method of producing glycols which comprises chlorinating hydrocarbons of the ethylene series to form dichlorids and saponifying the dichlorids by treatment with an aqueous solution of sodium carbonate, under pressure, and thereby producing the glycols.

In testimony whereof I affix my signature.

HAROLD HIBBERT.